United States Patent
Murata et al.

(10) Patent No.: US 8,220,443 B2
(45) Date of Patent: Jul. 17, 2012

(54) EGR SYSTEM FOR INTERNAL COMBUSTION ENGINE AND METHOD FOR CONTROLLING THE SAME

(75) Inventors: Hiroki Murata, Gotenba (JP); Masahiro Nagae, Nishikamo-gun (JP); Hajime Shimizu, Susono (JP); Shigeki Nakayama, Susono (JP); Tomomi Onishi, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 460 days.

(21) Appl. No.: 12/441,241

(22) PCT Filed: Jan. 10, 2008

(86) PCT No.: PCT/IB2008/000042
§ 371 (c)(1),
(2), (4) Date: Mar. 13, 2009

(87) PCT Pub. No.: WO2008/087513
PCT Pub. Date: Jul. 24, 2008

(65) Prior Publication Data
US 2009/0283077 A1   Nov. 19, 2009

(30) Foreign Application Priority Data
Jan. 18, 2007 (JP) .................................. 2007-009272

(51) Int. Cl.
*F02M 25/07* (2006.01)
*F02B 47/08* (2006.01)
*F02B 33/44* (2006.01)

(52) U.S. Cl. ........... 123/568.2; 123/568.12; 123/568.21; 60/605.2

(58) Field of Classification Search ............ 123/568.11–568.13, 568.17, 568.18, 568.2, 568.21; 701/108; 60/602, 605.2
See application file for complete search history.

(56) References Cited

U.S. PATENT DOCUMENTS

| | | | | |
|---|---|---|---|---|
| 4,517,950 A * | 5/1985 | Mayer et al. | ............... | 123/559.2 |
| 6,138,649 A * | 10/2000 | Khair et al. | ............. | 123/568.12 |
| 6,899,090 B2 * | 5/2005 | Arnold | .................... | 123/568.12 |
| 6,973,786 B1 * | 12/2005 | Liu et al. | ....................... | 60/605.2 |
| 6,988,365 B2 * | 1/2006 | Sasaki | .......................... | 60/605.2 |
| 7,377,270 B2 * | 5/2008 | Duffy et al. | ............. | 123/568.12 |
| 7,681,394 B2 * | 3/2010 | Haugen | ....................... | 60/605.2 |

(Continued)

FOREIGN PATENT DOCUMENTS
JP   08-170540 A   7/1996

(Continued)

*Primary Examiner* — Willis Wolfe, Jr.
(74) *Attorney, Agent, or Firm* — Sughrue Mion, PLLC

(57) ABSTRACT

An EGR system includes a high-pressure EGR unit and a low-pressure EGR unit. During the steady operation of an internal combustion engine, the high-pressure EGR gas and the low-pressure EGR gas are mixed with each other at a mixture ratio, in which the ratio of the high-pressure EGR gas amount to the entire EGR gas amount is higher than that in a known mixture ratio, and then recirculated back to the internal combustion engine. In the engine speed-up transitional operation period, the opening amount of a high-pressure EGR valve is adjusted to the opening amount that is much smaller than the target opening amount corresponding to the target operation mode. Thus, it is possible to suppress occurrence of the situation where the entire EGR gas amount is excessive in the period in which the low-pressure EGR gas amount does not decrease by a sufficient amount.

6 Claims, 5 Drawing Sheets

U.S. PATENT DOCUMENTS

2004/0050375 A1  3/2004  Arnold

FOREIGN PATENT DOCUMENTS

| JP | 2004-150319 | A |   | 5/2004 |
| JP | 2005-127247 | A |   | 5/2005 |
| JP | 2005127247  | A | * | 5/2005 |
| JP | 2006-336547 | A |   | 12/2006 |

* cited by examiner

EGR SYSTEM FOR INTERNAL COMBUSTION ENGINE AND METHOD FOR CONTROLLING THE SAME

BACKGROUND OF THE INVENTION

1. Field of the Invention

The invention relates to an EGR (exhaust gas recirculation) system for an internal combustion engine, and a method for controlling the same.

2. Description of the Related Art

EGR, i.e., a technology for providing communication between an exhaust passage and an intake passage and recirculating a portion of the exhaust gas back to an internal combustion engine has been suggested in order to reduce the amount of nitrogen oxide (NOx) generated in the process of burning fuel in the internal combustion engine.

A technology that makes it possible to perform EGR in a broader operating range of an internal combustion engine has been suggested in, for example, Japanese Patent Application Publication No. 2004-150319 (JP-A-2004-150319). JP-A-2004-150319 describes a system that includes a high-pressure EGR unit and a low-pressure EGR unit, and that performs EGR while changing the EGR unit used for EGR between the high-pressure EGR unit and the low-pressure EGR unit or using both the high-pressure EGR unit and the low-pressure EGR unit in combination, based on the operation mode of an internal combustion engine. The high-pressure EGR unit recirculates a portion of the exhaust gas back to the internal combustion engine through a high-pressure EGR passage that provides communication between an exhaust passage, at a portion upstream of a turbine of a turbocharger, and an intake passage, at a portion downstream of a compressor of the turbocharger. The low-pressure EGR unit recirculates a portion of the exhaust gas back to the internal combustion engine through a low-pressure EGR passage that provides communication between the exhaust passage, at a portion downstream of the turbine, and the intake passage, at a portion upstream of the compressor.

With this EGR system, the amount of exhaust gas, which is recirculated back to the internal combustion engine by the high-pressure EGR unit (hereinafter, referred to as the "high-pressure EGR gas"), and the amount of exhaust gas, which is recirculated back to the internal combustion engine by the low-pressure EGR unit (hereinafter, referred to as the "low-pressure EGR gas"), are adjusted to the specified values determined in advance. When the amount of high-pressure EGR gas and the amount of low-pressure EGR gas are at the specified values, optimum predetermined engine characteristics such as the exhaust gas properties and the fuel efficiency characteristics are achieved.

During the steady operation of the internal combustion engine, the high-pressure EGR gas amount and the low-pressure EGR gas amount are appropriately adjusted to the specified values. However, in the transitional operation period in which the operation mode of the internal combustion engine is changing, especially the amount of low-pressure EGR gas, which flows through a flow path that is relatively long, is likely to deviate from the specified value. This may cause inconveniences such as generation of smoke.

SUMMARY OF THE INVENTION

The invention provides a technology for suppressing deterioration in the exhaust gas properties in a transitional period in which the operation mode of an internal combustion engine, which is provided with an EGR system that performs EGR using a high-pressure EGR unit and a low-pressure EGR unit in combination, is changing.

A first aspect of the invention relates to an EGR system for an internal combustion engine. The EGR system includes: a turbocharger that includes a compressor arranged in an intake passage of the internal combustion engine, and a turbine arranged in an exhaust passage of the internal combustion engine; a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor; a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; a high-pressure EGR valve that is provided in the high-pressure EGR passage, and that changes the flow passage area of the high-pressure EGR passage; a low-pressure EGR valve that is provided in the low-pressure EGR passage, and that changes the flow passage area of the low-pressure EGR passage; and an EGR control unit that adjusts the opening amount of the high-pressure EGR valve to the reference high-pressure EGR valve opening amount determined based on the operation mode of the internal combustion engine, and adjusts the opening amount of the low-pressure EGR valve to the reference low-pressure EGR valve opening amount determined based on the operation mode of the internal combustion engine. In the transitional period in which the operation mode of the internal combustion engine is changing from the predetermined first operation mode to the second operation mode in which a load, which is higher than a load in the first operation mode, is applied to the internal combustion engine, the EGR control unit adjusts the opening amount of the high-pressure EGR valve to an opening amount that is smaller than the reference high-pressure EGR valve opening amount corresponding to the second operation mode.

The "reference high-pressure EGR valve opening amount" is a specified value of the opening amount of the high-pressure EGR valve, which is determined in advance based on the operation mode of the internal combustion engine. When the opening amount of the high-pressure EGR valve matches the reference high-pressure EGR valve opening amount, the high-pressure EGR gas amount during the steady operation of the internal combustion engine matches a predetermined reference high-pressure EGR gas amount. The "reference low-pressure EGR valve opening amount" is a specified value of the opening amount of the low-pressure EGR valve, which is determined in advance based on the operation mode of the internal combustion engine. When the opening amount of the low-pressure EGR valve matches the reference low-pressure EGR valve opening amount, the low-pressure EGR gas amount during the steady operation of the internal combustion engine matches a predetermined reference low-pressure EGR gas amount.

The "reference high-pressure EGR gas amount" and the "reference low-pressure EGR gas amount" are a specified value of the high-pressure EGR gas amount and a specified value of the low-pressure EGR gas amount, respectively, which are determined in advance. When the high-pressure EGR gas amount and the low-pressure EGR gas amount match the reference high-pressure EGR gas amount and the reference low-pressure EGR gas amount, respectively, the characteristics of the EGR system such as the exhaust gas properties and the fuel efficiency characteristics are optimized.

For example, the NOx discharge amount is correlated with the total amount of exhaust gas recirculated back to the internal combustion engine by the high-pressure EGR unit and the low-pressure EGR unit (hereinafter, referred to as the "entire EGR gas amount"). Therefore, a specified value of the entire EGR gas amount (hereinafter, referred to as a "reference entire EGR gas amount") is determined so that the NOx discharge amount satisfies the requirement.

The specific fuel consumption related to performance of EGR is correlated with the mixture ratio between the high-pressure EGR gas and the low-pressure EGR gas (hereinafter, simply referred to as the "mixture ratio"). Accordingly, a specified value of the mixture ratio (hereinafter, referred to as a "reference mixture ratio") is determined so that the fuel efficiency characteristics satisfy the requirement.

The high-pressure EGR gas amount is adjusted to the reference high-pressure EGR gas amount by adjusting the opening amount of the high-pressure EGR valve to the reference high-pressure EGR valve opening amount during the steady operation of the internal combustion engine. Also, the low-pressure EGR gas amount is adjusted to the reference low-pressure EGR gas amount by adjusting the opening amount of the low-pressure EGR valve to the reference low-pressure EGR valve opening amount during the steady operation of the internal combustion engine. Thus, it is possible to perform EGR under the condition where the predetermined engine characteristics are optimized during the steady operation of the internal combustion engine.

Next, a description will be provided concerning the EGR control executed in the transitional period in which the operation mode of the internal combustion engine is changing from the first operation mode to the second operation mode in which a load higher than that in the first operation mode is applied to the internal combustion engine.

The "first operation mode" is an operation mode in which the reference low-pressure EGR valve opening amount is a value other than zero, that is, an operation mode in which EGR is performed by the low-pressure EGR unit.

In the engine speed-up transitional operation period in which the operation mode of the internal combustion engine is changing from the first operation mode to the second operation mode, the fuel injection amount is increased because the load applied to the internal combustion engine increases. Accordingly, the total amount of exhaust gas recirculated back to the internal combustion engine (i.e., entire EGR gas amount) needs to be decreased in order to maintain a sufficient oxygen concentration in cylinders to appropriately burn the fuel.

Therefore, the reference high-pressure EGR valve opening amount corresponding to the second operation mode (hereinafter, referred to as the "second high-pressure EGR valve opening amount") is set to a value smaller than the reference high-pressure EGR valve opening amount corresponding to the first operation mode (hereinafter, referred to as the "first high-pressure EGR valve opening amount"). The reference low-pressure EGR valve opening amount corresponding to the second operation mode (hereinafter, referred to as the "second low-pressure EGR valve opening amount") is set to a value smaller than the reference low-pressure EGR valve opening amount corresponding to the first operation mode (hereinafter, referred to as the "first low-pressure EGR valve opening amount").

At a time at which the opening amount of the high-pressure EGR valve is changed from the first high-pressure EGR valve opening amount to the second high-pressure EGR valve opening amount, the amount of high-pressure EGR gas that passes through the high-pressure EGR valve changes from the reference high-pressure EGR gas amount corresponding to the first operation mode (hereinafter, referred to as the "first high-pressure EGR gas amount") to the reference high-pressure EGR gas amount corresponding to the second operation mode (hereinafter, referred to as the "second high-pressure EGR gas amount").

Usually, the high-pressure EGR passage connects portions that are close to each other, for example, connects the exhaust passage, at portion near an exhaust manifold, and the intake passage, at a portion near an intake manifold, to each other. Accordingly, a portion of the high-pressure EGR gas flow path, which is downstream of the high-pressure EGR valve and which leads to the cylinders, has a considerably short length and a small passage volume.

Therefore, the amount of high-pressure EGR gas which has already passed through the high-pressure EGR valve and which still remains in the high-pressure EGR passage or the intake passage without being taken into the cylinders (hereinafter, referred to as the "residual high-pressure EGR gas) is considerably small at a time at which the opening amount of the high-pressure EGR valve is changed.

Accordingly, when the opening amount of the high-pressure EGR valve is changed to the second high-pressure EGR valve opening amount, the amount of high-pressure EGR gas actually taken in the cylinders (hereinafter, referred to as the "actual high-pressure EGR gas amount") is promptly decreased from the first high-pressure EGR gas amount to the second high-pressure EGR gas amount.

At a time at which the opening amount of the low-pressure EGR valve is changed from the first low-pressure EGR valve opening amount to the second low-pressure EGR valve opening amount, the amount of low-pressure EGR gas that passes through the low-pressure EGR valve is changed from the reference low-pressure EGR gas amount corresponding to the first operation mode (hereinafter, referred to as the "first low-pressure EGR gas amount") to the reference low-pressure EGR gas amount corresponding to the second operation mode (hereinafter, referred to as the "second low-pressure EGR gas amount").

However, because the low-pressure EGR passage 31 is connected to the intake passage, at a position upstream of the compressor of the turbocharger, the compressor, an inter cooler, etc. are located on a portion of the low pressure EGR gas flow path, which is downstream of the low-pressure EGR valve and which leads to the cylinders. Accordingly, the portion of the low pressure EGR gas flow path has a long length and a large passage volume.

Therefore, the amount of low-pressure EGR gas which has already passed through the low-pressure EGR valve and which still remains in the low-pressure EGR passage or the intake passage without being taken into the cylinders (hereinafter, referred to as the "residual low-pressure EGR gas") is relatively large at a time at which the opening amount of the low-pressure EGR valve is changed.

Accordingly, after the opening amount of the low-pressure EGR valve is changed to the second low-pressure EGR valve opening amount, the amount of low-pressure EGR gas actually taken in the cylinders (hereinafter, referred to as the "actual low-pressure EGR gas amount") is gradually decreased from the first low-pressure EGR gas amount to the second low-pressure EGR gas amount.

Namely, in the case of the low-pressure EGR gas, after the opening amount of the low-pressure EGR valve is changed to the second low-pressure EGR valve opening amount, the actual low-pressure EGR gas amount is larger than the second low-pressure EGR gas amount in a period referred to as a "low-pressure EGR gas amount transitional period".

Therefore, in the engine speed-up transitional operation period in which the operation mode of the internal combustion engine is changing from the first operation mode to the second operation mode, even if the opening amount of the high-pressure EGR valve is changed from the first high-pressure EGR valve opening amount to the second high-pressure EGR valve opening amount and the opening amount of the low-pressure EGR valve is changed from the first low-pressure EGR valve opening amount to the second low-pressure EGR valve opening amount, the entire EGR gas amount may be larger than a specified value of the entire EGR gas amount corresponding to the second operation mode (namely, the sum of the second high-pressure EGR gas amount and the second low-pressure EGR gas amount. Hereinafter, referred to as a "second entire EGR gas amount") in the low-pressure EGR gas amount transitional period. In this case, the oxygen concentration in the cylinders may be insufficient with respect to the increased fuel injection amount, resulting in generation of smoke.

Therefore, according to the first aspect of the invention, in the transitional period in which the operation mode of the internal combustion engine is changing from the first operation mode to the second operation mode, at least the opening amount of the high-pressure EGR valve is changed from the first high-pressure EGR valve opening amount to an opening amount that is smaller than the second high-pressure EGR valve opening amount (hereinafter, referred to as a "corrected second high-pressure EGR valve opening amount").

The "corrected second high-pressure EGR valve opening amount" is the opening amount of the high-pressure EGR valve determined in advance in such a manner that the sum of the high-pressure EGR gas amount, which is achieved when the opening amount of the high-pressure EGR valve is brought to the corrected second high-pressure EGR valve opening amount during the steady operation of the internal combustion engine (hereinafter, referred to as the "corrected second high-pressure EGR gas amount"), and the actual low-pressure EGR gas amount in the low-pressure EGR gas amount transitional period does not exceed the second entire EGR gas amount.

In other words, the corrected second high-pressure EGR gas amount is set to a value that is smaller than the second high-pressure EGR gas amount by at least an amount by which the actual low-pressure EGR gas amount is larger than the second low-pressure EGR gas amount in the low-pressure EGR gas amount transitional period.

As described above, the actual high-pressure EGR gas amount changes promptly in response to a change in the opening amount of the high-pressure EGR valve. Accordingly, if the opening amount of the high-pressure EGR valve is changed from the first high-pressure EGR valve opening amount to the corrected second high-pressure EGR valve opening amount, the actual high-pressure EGR gas amount is promptly decreased from the first high-pressure EGR gas amount to the corrected second high-pressure EGR gas amount.

Thus, in the low-pressure EGR gas amount transitional period, the amount by which the actual low-pressure EGR gas amount is larger than the second low-pressure EGR gas amount is offset by the amount by which the actual high-pressure EGR gas amount is smaller than the second high-pressure EGR gas amount. Therefore, it is possible to suppress occurrence of the situation in which the entire EGR gas amount is larger than the second entire EGR gas amount.

As a result, it is possible to suppress occurrence of inconveniences such as generation of smoke in the engine speed-up transitional operation period, in which the operation mode of the internal combustion engine is changing.

The corrected second high-pressure EGR valve opening amount may be a fixed value or a variable value. When the corrected second high-pressure EGR valve opening amount is a fixed value, preferably, the corrected second high-pressure EGR valve opening amount is set in such a manner that the sum of the corrected second high-pressure EGR gas amount and the first low-pressure EGR gas amount is substantially equal to the second entire EGR gas amount. When the corrected second high-pressure valve opening amount is a variable value, preferably, the corrected second high-pressure valve opening amount is set in such a manner that the amount by which the corrected second high-pressure EGR gas amount is smaller than the second high-pressure EGR gas amount is gradually decreased as the actual low-pressure EGR gas amount gradually approaches the second low-pressure EGR gas amount with the passage of time after the operation mode of the internal combustion engine is changed from the first operation mode to the second operation mode.

As described above, even if the opening amount of the low-pressure EGR valve is changed, it is difficult to promptly change the actual low-pressure EGR gas amount. In contrast, if the opening amount of the high-pressure EGR valve is changed, it is possible to promptly change the actual high-pressure EGR gas amount.

Accordingly, as in the first aspect of the invention, when the entire EGR gas amount is changed by changing the opening amount of the high-pressure EGR valve and the opening amount of the low-pressure EGR valve, as the ratio of the high-pressure EGR gas amount to the entire EGR gas amount becomes higher, the entire EGR gas amount is changed to the target entire EGR gas amount more promptly.

Therefore, in the first aspect of the invention, the reference mixture ratio may be set to a mixture ratio in which the ratio of the high-pressure EGR gas amount, to the entire EGR gas amount is higher than that in a known reference mixture ratio (hereinafter, referred to as a "transitional-period mixture ratio").

An example of the known reference mixture ratio is a mixture ratio at which the specific fuel consumption related to performance of EGR is minimized (hereinafter, referred to as a "optimum fuel-efficiency mixture ratio").

Thus, it is possible to enhance the efficiency in controlling the entire EGR gas amount in the transitional period in which the operation mode of the internal combustion engine is changing. For example, in the engine speed-up transitional operation period in which the operation mode of the internal combustion engine is changing from the first operation mode to the second operation mode, the entire EGR gas amount is more promptly changed from the first entire EGR gas amount to the second entire EGR gas amount. As a result, it is possible to more reliably suppress generation of smoke in the engine speed-up transitional operation period.

If the transitional-period mixture ratio is set in such a manner that the difference between the transitional-period mixture ratio and optimum fuel-efficiency mixture ratio does not exceeds a predetermined upper limit value, it is possible to configure the EGR system that controls the EGR gas amount more efficiently in the transitional period while exhibiting sufficient fuel efficiency characteristics although the specific fuel consumption related to performance of EGR is not minimized.

In the first aspect of the invention, the reference mixture ratio during the steady operation of the internal combustion engine may be set to a known mixture ratio, for example, the optimum fuel-efficiency mixture ratio. In addition, when it is predicted that the operation mode of the internal combustion engine will be changed to the engine speed-up transitional operation mode, the reference mixture ratio may be changed to the transitional-period mixture ratio.

More specifically, the EGR system according to the first aspect of the invention may further include an engine speed-up prediction unit that predicts whether the operation mode of the internal combustion engine will be changed from the first operation mode to the second operation mode. When the engine speed-up prediction unit predicts that the operation mode of the internal combustion engine will be changed from the first operation mode to the second operation mode, the EGR control unit may adjust the opening amount of the high-pressure EGR valve to an opening amount that is larger than the reference high-pressure EGR valve opening amount (hereinafter, referred to as a "corrected first high-pressure EGR valve opening amount") so that the ratio of the high-pressure EGR gas amount to the entire EGR gas amount is higher than that before the engine speed-up prediction unit predicts that the operation mode of the internal combustion engine will be changed from the first operation mode to the second operation mode.

The "corrected first high-pressure EGR valve opening amount" is an opening amount of the high-pressure EGR valve determined in advance in such a manner that the ratio of the high-pressure EGR gas amount, which is achieved when the high-pressure EGR valve opening amount is brought to the corrected first high-pressure EGR valve opening amount during the steady operation of the internal combustion engine, to the entire EGR gas amount is higher than the ratio of the first high-pressure EGR gas amount to the entire EGR gas amount.

Whether the operation mode of the internal combustion engine will be changed to the engine speed-up transitional may be predicted based on, for example, the history or the rate of time-change of the depression amount of an accelerator pedal. Alternatively, the prediction may be made based on the history or the rate of time-change of the fuel injection amount.

Thus, for example, during the steady operation of the internal combustion engine, it is possible to minimize the specific fuel consumption related to performance of EGR by setting the reference mixture ratio to the optimum fuel-efficiency mixture ratio. In addition, it is possible to appropriately suppress generation of smoke in the engine speed-up transitional operation period, because the transitional-period mixture ratio is used as the reference mixture ratio after it is predicted that the engine speed will increase until the engine speed-up transitional operation period ends.

In the first aspect of the invention, the EGR control unit may maintain the opening amount of the high-pressure EGR valve at the corrected second high-pressure EGR valve opening amount during a predetermined period after the operation mode of the internal combustion engine is changed from the first operation mode to the second operation mode.

The "predetermined period" is determined in advance based on the time required for the low-pressure EGR gas, which has already been introduced into the intake passage, at a portion downstream of the low-pressure EGR valve and which still remains in the intake passage without being taken in the cylinders at a time at which the opening amount of the low-pressure EGR valve is changed from the first low-pressure EGR valve opening amount to the second low-pressure EGR valve opening amount, to be entirely taken in the cylinders. The predetermined period may be equal to the low-pressure EGR gas amount transitional period.

Thus, during the period after the opening amount of the low-pressure EGR valve is changed to the second low-pressure EGR valve opening amount until the actual low-pressure EGR gas amount is changed to the second low-pressure EGR gas amount, the situation where the actual high-pressure EGR gas amount is smaller than the second high-pressure EGR gas amount is maintained. Therefore, it is possible to suppress occurrence of the situation where the entire EGR gas amount is larger than the second entire EGR gas amount. As a result, it is possible to more reliably suppress generation of smoke in the engine speed-up transitional operation period.

A second aspect of the invention relates to a method for controlling an EGR system for an internal combustion engine. The EGR system includes: a turbocharger that includes a compressor arranged in an intake passage of the internal combustion engine, and a turbine arranged in an exhaust passage of the internal combustion engine; a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor; a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; a high-pressure EGR valve that is provided in the high-pressure EGR passage, and that changes the flow passage area of the high-pressure EGR passage; and a low-pressure EGR valve that is provided in the low-pressure EGR passage, and that changes the flow passage area of the low-pressure EGR passage. According to the method, the opening amount of the high-pressure EGR valve is adjusted to the reference high-pressure EGR valve opening amount determined based on the operation mode of the internal combustion engine, and the opening amount of the low-pressure EGR valve is adjusted to the reference low-pressure EGR valve opening amount determined based on the operation mode of the internal combustion engine. Then, in the transitional period in which the operation mode of the internal combustion engine is changing from the predetermined first operation mode to the second operation mode in which a load higher than a load in the first operation mode is applied to the internal combustion engine, the opening amount of the high-pressure EGR valve adjusted to, an opening amount that is smaller than the reference high-pressure EGR valve opening amount corresponding to the second operation mode.

The aspects of the invention described above makes it possible to suppress deterioration in the exhaust gas properties in the transitional period in which the operation mode of the internal combustion engine, which is provided with the EGR system that performs EGR using the high-pressure EGR unit and the low-pressure EGR unit in combination, is changing.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Hereafter, an example embodiment of the invention will be described in detail with reference to the accompanying drawings. Unless otherwise noted, the sizes, materials, shapes, relative arrangements, etc. of the components described in the embodiment do not limit the technical scope of the invention.

Figure 1:
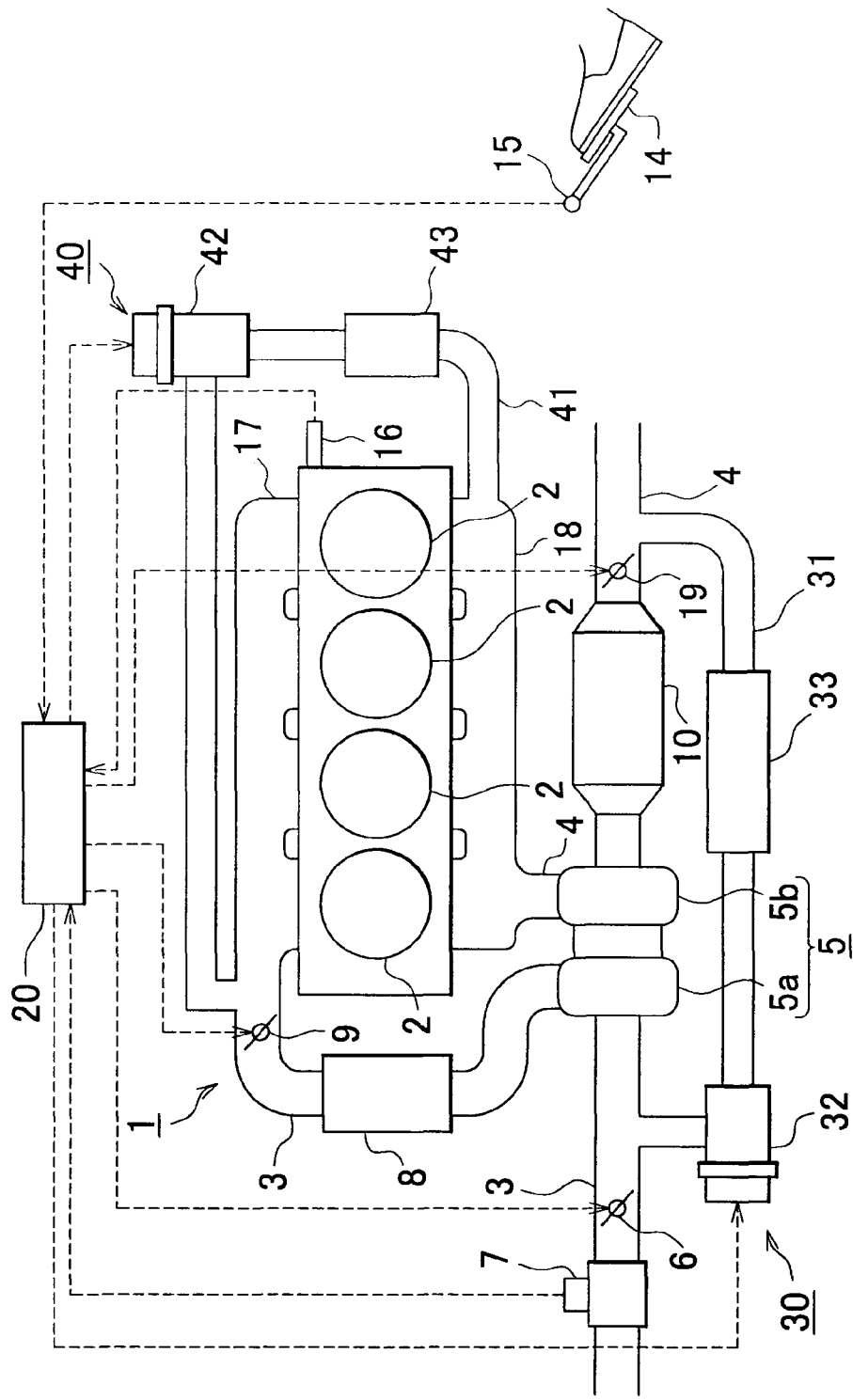
FIG. 1 is a view schematically showing the structure of an intake system and an exhaust system of an internal combustion, engine provided with an EGR system according to an embodiment of the invention.

FIG. 1 is a view schematically showing an intake system and an exhaust system of an internal combustion engine provided with an EGR system for an internal combustion engine according to the embodiment of the invention. An internal combustion engine 1 shown in FIG. 1 is a water-cooled four-cycle diesel engine having four cylinders 2.

An intake manifold 17 and an exhaust manifold 18 are connected to the cylinders 2 of the internal combustion engine 1. An intake pipe 3 is connected to the intake manifold 17. A second intake throttle valve 9, which regulates the flow rate of the intake air flowing through the intake pipe 3, is provided at a position near the connection portion at which the intake manifold 17 and the intake pipe 3 are connected to each other. The second intake throttle valve 9 is opened/closed by an electric actuator. An intercooler 8, which cools the intake air by exchanging heat between the intake air and the outside air, is provided in the intake pipe 3, at a position upstream of the second intake throttle valve 9. A compressor housing 5a of a turbocharger 5 that operates using the energy of the exhaust gas as a driving source is provided in the intake pipe 3, at a position upstream of the intercooler 8. A first intake throttle valve 6, which regulates the flow rate of the intake air flowing through the intake pipe 3, is provided in the intake pipe 3, at a position upstream of the compressor housing 5a. The first intake throttle valve 6 is opened/closed by an electric actuator. An airflow meter 7 that outputs an electric signal indicating the flow rate of the newly-taken air flowing through the intake pipe 3 is provided in the intake pipe 3, at a position upstream of the first intake throttle valve 6. The airflow meter 7 detects the intake air amount.

An exhaust pipe 4 is connected to the exhaust manifold 18. A turbine housing 5b of the turbocharger 5 is provided in a middle portion of the exhaust pipe 4. An exhaust gas control apparatus 10 is provided in the exhaust pipe 4, at a position downstream of the turbine housing 5b. The exhaust gas control apparatus 10 includes an oxidation catalyst and a particulate filter (hereinafter, referred to as a "filter") that is provided at a position downstream of the oxidation catalyst. The filter supports a NOx storage reduction catalyst (hereinafter, referred to as a "NOx catalyst"). An exhaust throttle valve 19, which regulates the flow rate of the exhaust gas flowing through the exhaust pipe 4, is provided in the exhaust pipe 4, at a position downstream of the exhaust gas control apparatus 10. The exhaust throttle valve 19 is opened/closed by an electric actuator in the embodiment of the invention, the exhaust throttle valve 19 is provided in the exhaust pipe 4, at a position immediately downstream of the exhaust gas control apparatus 10. Alternatively, the exhaust gas throttle valve 19 may be provided in the exhaust pipe 4, at a position downstream of the connection portion at which a low-pressure EGR passage 31, which will be described later in detail, is connected to the exhaust pipe 4.

The internal combustion engine 1 is provided with a low-pressure EGR unit 30 that introduces a portion of the exhaust gas, flowing through the exhaust pipe 4, to the intake pipe 3, at low pressure, to recirculate it back to the cylinders 2. The low-pressure EGR unit 30 includes the low-pressure EGR passage 31, a low-pressure EGR valve 32 and a low-pressure EGR cooler 33.

The low-pressure EGR passage 31 provides communication between the exhaust pipe 4, at a portion downstream of the exhaust throttle valve 19, and the intake pipe 3, at a portion upstream of the compressor housing 5a and downstream of the first intake throttle valve 6. The exhaust gas is introduced to the intake pipe 3, at low pressure, through the low-pressure EGR passage 31. In the following description concerning the embodiment of the invention, the exhaust gas that is recirculated back to the cylinders 2 through the low-pressure EGR passage 31 will be referred to as the "low-pressure EGR gas".

The low-pressure EGR valve 32 is a flow-rate regulating valve that regulates the flow rate of the exhaust gas flowing through the low-pressure EGR passage 31 by changing the flow passage area of the low-pressure EGR passage 31. The flow rate of the low-pressure EGR gas is regulated by adjusting the opening amount of the low-pressure EGR valve 32. The flow rate of the low-pressure EGR gas may be regulated by a method other than adjustment of the opening amount of the low-pressure EGR valve 32. For example, the flow rate of the low-pressure EGR gas may be regulated in a method in which the pressure difference between the upstream side and the downstream side of the low-pressure EGR passage 31 is changed by adjusting the opening amount of the first intake throttle valve 6.

The low-pressure EGR cooler 33 promotes heat exchange between the low-pressure EGR gas flowing through the low-pressure EGR cooler 33 and the coolant that cools the internal combustion engine 1 to cool the low-pressure EGR gas.

The internal combustion engine 1 is provided with a high-pressure EGR unit 40 that introduces a portion of the exhaust gas flowing through the exhaust pipe 4 to the intake pipe 3, at high pressure, to recirculate it back to the cylinders 2. The high-pressure EGR unit 40 includes a high-pressure EGR passage 41, a high-pressure EGR valve 42, and a high-pressure EGR cooler 43.

The high-pressure EGR passage 41 provides communication between the exhaust manifold 18 and the intake manifold 17. The exhaust gas is introduced to the intake pipe 3, at high pressure, through the high-pressure EGR passage 41. In the following description concerning the embodiment of the invention, the exhaust gas that is recirculated back to the cylinders 2 through the high-pressure EGR passage 41 will be referred to as the "high-pressure EGR gas".

The high-pressure EGR valve 42 is a flow-rate regulating valve that regulates the flow rate of the exhaust gas flowing through the high-pressure EGR passage 41 by changing the flow passage area of the high-pressure EGR passage 41. The flow rate of the high-pressure EGR gas is regulated by adjusting the opening amount of high-pressure EGR valve 42. The flow rate of the high-pressure EGR gas may be regulated by a method other than adjustment of the opening amount of high-pressure EGR valve 42. For example, the flow rate of the high-pressure EGR gas may be regulated in a method in which the pressure difference between the upstream side and the downstream side of the high-pressure EGR passage 41 is changed by adjusting the opening amount of the second intake throttle valve 9. When the turbocharger 5 is a variable capacity turbocharger, the flow rate of the high-pressure EGR gas may be regulated by adjusting the opening amount of a nozzle vane that changes the flow characteristics of the exhaust gas that flows into the turbine.

The high-pressure EGR cooler 43 cools the high-pressure EGR gas by exchanging heat between the high-pressure EGR gas that flows through the high-pressure EGR cooler 43 and the coolant that cools the internal combustion engine 1.

The internal combustion engine 1 is provided with a crank position sensor 16 that detects the crank angle of a crankshaft of the internal combustion engine 1 and the rotational speed of the internal combustion engine 1, an accelerator angle sensor 15 that outputs an electric signal indicating the amount by which an accelerator pedal 14 is depressed by the driver, and that detects the load applied to the internal combustion engine 1, and the airflow meter 7 that detects the flow rate of the newly-taken air flowing through the intake pipe 3. In addition, the internal combustion engine 1 is provided with various sensors (not shown) that are usually provided to a diesel engine.

The thus configured internal combustion engine 1 is provided with an ECU 20 formed of a computer that controls the internal combustion engine 1. The above-described sensors are connected to the ECU 20 via electric wiring, and signals output from the sensors are transmitted to the ECU 20. Various devices such as the low-pressure EGR valve 32, the high-pressure EGR valve 42, the first intake throttle valve 6, the second intake throttle valve 9, and the exhaust throttle valve 19 are connected to the ECU 20 via electric wiring. These devices are controlled according to control signals transmitted from the ECU 20.

Next, the EGR control according to the embodiment of the invention executed by the ECU 20 will be described.

In the EGR system according to the embodiment of the invention, specified values of the parameters related to the EGR control (hereinafter, referred to as the "EGR parameters") are determined in advance for each operation mode of the internal combustion engine 1, and stored in ROM of the ECU 20. The specified values include the specified value of the low-pressure EGR gas amount (hereinafter, referred to as the "reference low-pressure EGR gas amount"), the specified value of the high-pressure EGR gas amount (hereinafter, referred to as the "reference high-pressure EGR gas amount"), the specified value (hereinafter, referred to as the "reference entire EGR gas amount") of the total amount of exhaust gas recirculated back to the internal combustion engine 1 by the low-pressure EGR unit 30 and the high-pressure EGR unit 40 (hereinafter, referred to as the "entire EGR gas amount"), the specified value (hereinafter, referred to as the "reference mixture ratio") of the mixture ratio between the high-pressure EGR gas and the low-pressure EGR gas (hereinafter, referred to as the "mixture ratio" where appropriate), etc. When the EGR parameters are at the specified values, the characteristics related to the EGR system such as the exhaust gas properties, for example, the NOx discharge amount and the specific fuel consumption related to performance of EGR satisfy the requirements.

Then, the opening amount of the low-pressure EGR valve 32, at which the low-pressure EGR gas amount matches the reference low-pressure EGR gas amount when the internal combustion engine 1 performs the steady operation, is determined and used as the reference low-pressure EGR valve opening amount. The opening amount of the high-pressure EGR valve 42, at which the high-pressure EGR gas amount matches the reference high-pressure EGR gas amount when the internal combustion engine 1 performs the steady operation, is determined and used as the reference high-pressure EGR valve opening amount. The reference low-pressure EGR valve opening amount and the reference high-pressure EGR valve opening amount are stored in the ROM of the ECU 20.

The ECU 20 reads the reference low-pressure EGR valve opening amount and the reference high-pressure EGR valve opening amount from the ROM based on the operation mode of the internal combustion engine 1. The ECU 20 controls the low-pressure EGR valve 32 so that the opening amount of the low-pressure EGR valve 32 matches the reference low-pressure EGR valve opening amount. The ECU 20 also controls the high-pressure EGR valve 42 so that the opening amount of the high-pressure EGR valve 42 matches the reference high-pressure EGR valve opening amount.

The requirements for the characteristics of the EGR system, and the specified values of the EGR parameters, at which the requirements are satisfied, vary depending on the operation mode of the internal combustion engine 1.

The specified values of the EGR parameters used during the steady operation of the internal combustion engine 1 are set to values at which the NOx discharge amount is below a predetermined regulation value and the specific fuel consumption related to performance of EGR is minimized.

More specifically, because the NOx discharge amount is correlated with the entire EGR gas amount, the reference entire EGR gas amount is determined based on the known correlation between the NOx discharge amount and the entire EGR gas amount so that the requirements for the NOx discharge amount are satisfied.

Figure 2:
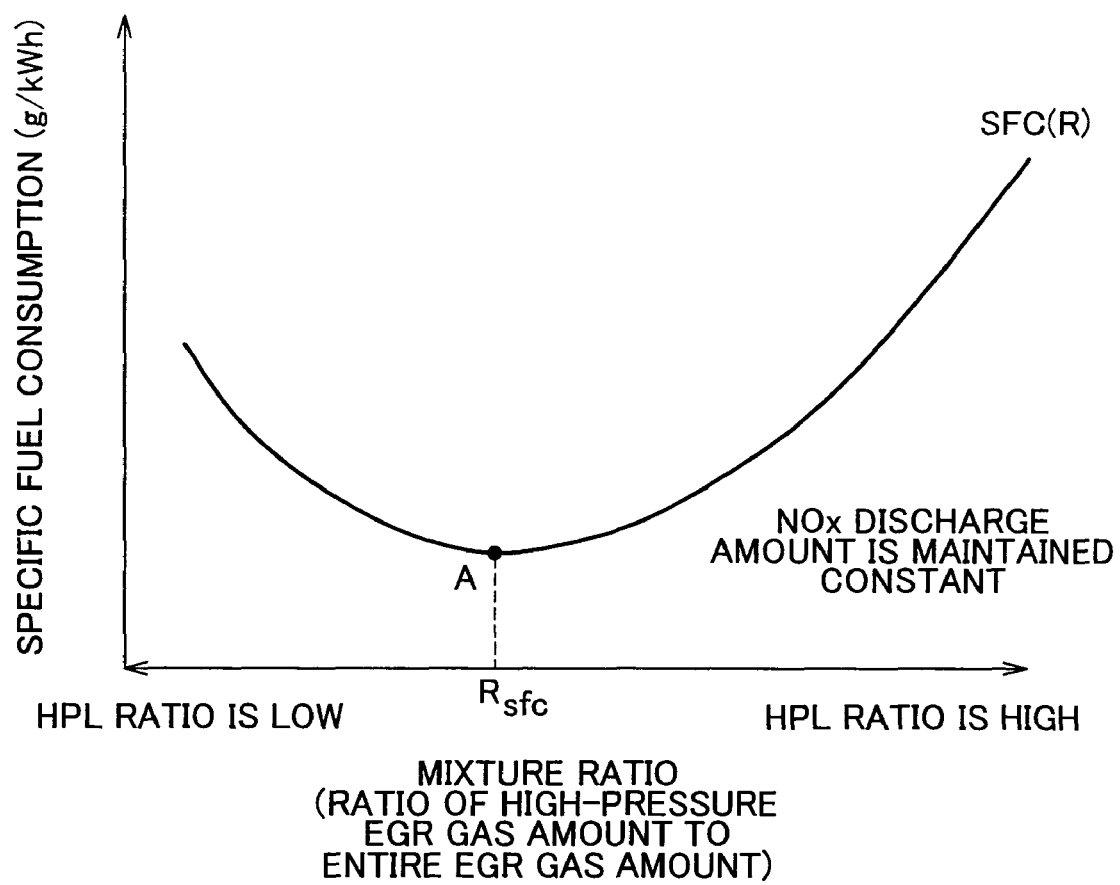
FIG. 2 is a graph showing the correlation between the mixture ratio between the high-pressure EGR gas and the low-pressure EGR gas (the ratio of the high-pressure EGR gas amount of the entire EGR gas amount), and the specific fuel consumption related to performance of EGR.

The specific fuel consumption related to performance of EGR is correlated with the mixture ratio. FIG. 2 is a graph showing the correlation between the mixture ratio and the specific fuel consumption. The abscissa axis in FIG. 2 represents the mixture ratio (the ratio of the high-pressure EGR gas amount to the entire EGR gas amount). A value on the right-hand side of the abscissa axis represents a high ratio of the high-pressure EGR gas amount to the entire EGR gas amount, and a value on the left-hand side of the abscissa axis represents a low ratio of the high-pressure EGR gas amount to the entire EGR gas amount. The ordinate axis in FIG. 2 represents the specific fuel consumption of the internal combustion engine 1.

The curve SFC (R) in FIG. 2 indicates a change in the specific fuel consumption that is correlated with the mixture ratio under the condition where the entire EGR gas amount is maintained constant (i.e., the NOx discharge amount is maintained constant). As shown in FIG. 2, the specific fuel consumption SFC (R) exhibits the minimum value at the point A at which the mixture ratio matches the value Rsfc. Hereinafter, the mixture ratio Rsfc, at which the specific fuel consumption SFC (R) exhibits the minimum value, will be referred to as the optimum fuel-efficiency mixture ratio.

Therefore, the EGR system is configured to have characteristics such that the specific fuel consumption related to performance of EGR is minimized by setting the reference mixture ratio to the optimum fuel-efficiency mixture ratio Rsfc.

Then, the reference high-pressure EGR gas amount and the reference low-pressure EGR gas amount are set by dividing the reference entire EGR gas amount into the high-pressure EGR gas amount and the low-pressure EGR gas amount so that the mixture ratio matches the optimum fuel-efficiency mixture ratio. In this manner, the specified values of the EGR parameters, which are used during the steady operation of the internal combustion engine 1, are determined.

Next, the specified values of the EGR parameters, which are used in the engine speed-up transitional operation period in which the operation mode of the internal combustion engine 1 is changing to the operation mode in which a higher load is applied to the internal combustion engine 1, are determined. These specified values are set to values, at which the entire EGR gas amount in the engine speed-up transitional operation period is appropriately controlled and the amount of smoke generated in the engine speed-up transitional operation period is suppressed.

Hereafter, with reference to FIGS. 3A to 3G, the EGR control that is executed in the engine speed-up transitional operation period will be described. In the engine speed-up transitional operation period, the operation mode of the internal combustion engine 1 is changing from the first operation mode, in which EGR is performed by the low-pressure EGR unit 30 (namely, the reference low-pressure EGR valve opening amount is not zero), to the second operation mode in which a load higher than that in the first operation mode is applied to the internal combustion engine 1.

Figure 3:
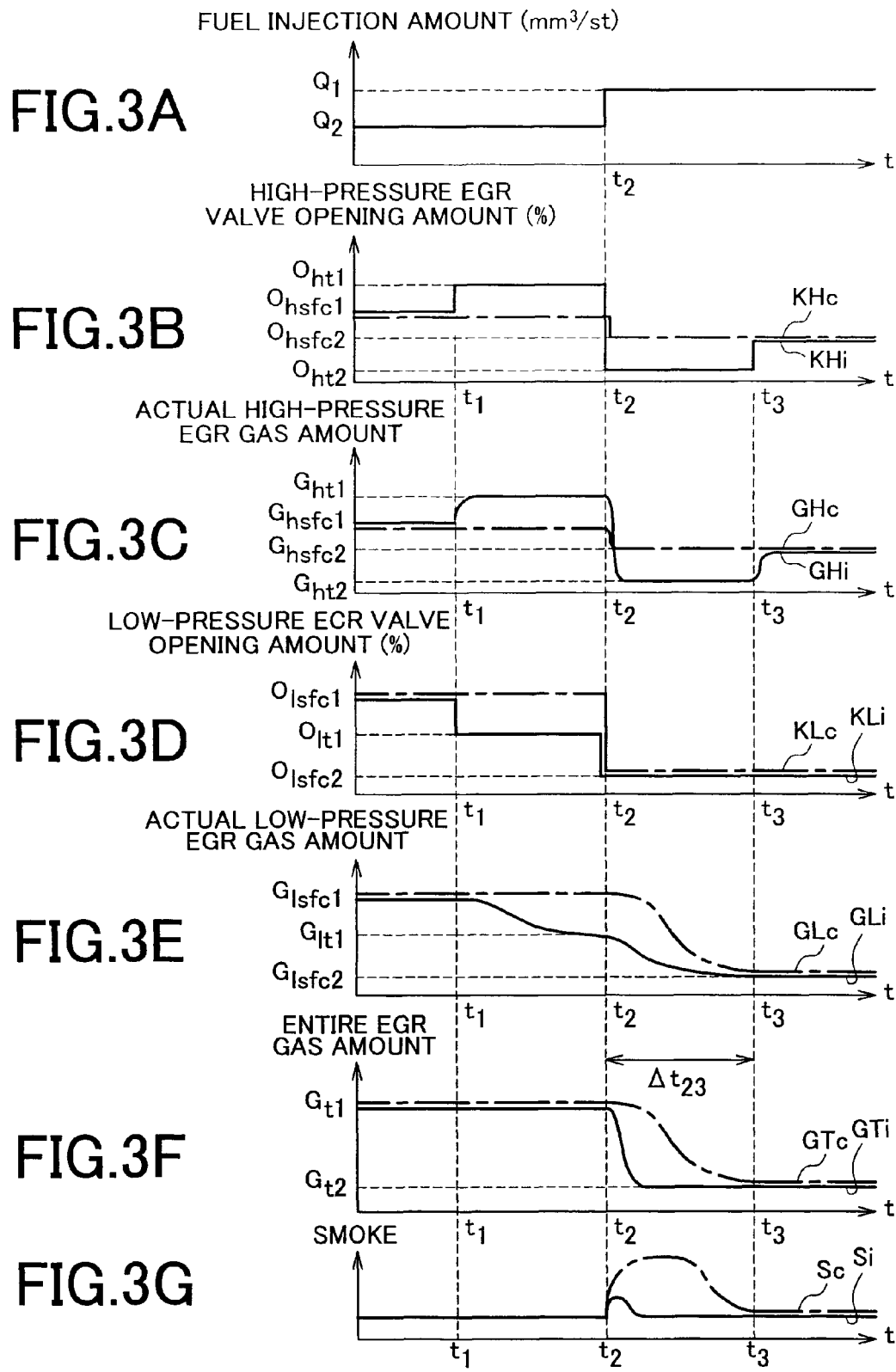
FIGS. 3A to 3G are time charts showing time-changes in the fuel injection amount, the opening amount of a high-pressure EGR valve, the actual high-pressure EGR gas amount, the opening amount of a low-pressure EGR valve, the actual low-pressure EGR gas amount, the entire EGR gas amount, and the amount of generated smoke in the engine speed-up transitional operation period in which the operation mode of an internal combustion engine provided with the EGR system according to the embodiment of the invention is changing.

FIGS. 3A to 3G are time charts showing time-changes in the fuel injection amount, various EGR parameters and the amount of smoke generated in the engine speed-up transitional operation period in which the operation mode of the internal combustion engine 1 is changing from the first operation mode to the second operation mode. More specifically, FIG. 3A shows a time-change in the fuel injection amount, FIG. 3B shows a time-change in the opening amount of the high-pressure EGR valve 42, FIG. 3C shows a time-change in the amount of high-pressure EGR gas actually taken in the cylinders 2 (hereinafter, referred to as the "actual high-pressure EGR gas amount"), FIG. 3D shows a time-change in the opening amount of the low-pressure EGR valve 32, FIG. 3E shows a time-change in the amount of low-pressure EGR gas actually taken in the cylinders 2 (hereinafter, referred to as the "actual low-pressure EGR gas amount"), FIG. 3F shows a time-change in the entire EGR gas amount, and FIG. 3G shows a time-change in the amount of generated smoke.

As shown in FIG. 3A, at time t2 at which the operation mode of the internal combustion engine 1 is changed from the first operation mode to the second operation mode, the fuel injection amount is increased from the amount Q1 to the amount Q2 (>Q1). Accordingly, the entire EGR gas amount needs to be decreased in order to maintain a sufficient oxygen concentration in the cylinders 2 to burn the fuel in an appropriate manner.

Therefore, in the existing EGR control executed in the engine speed-up transitional operation period, the opening amount of the high-pressure EGR valve 42 is changed, at time t2, from the reference high-pressure EGR valve opening amount (hereinafter, referred to as the "first high-pressure EGR valve opening amount") Ohsfc1 corresponding to the first operation mode during the steady operation of the internal combustion engine 1 to the reference high-pressure EGR valve opening amount (hereinafter, referred to as the "second high-pressure EGR valve opening amount") Ohsfc2 (<Ohsfc1) corresponding to the second operation mode during the steady operation of the internal combustion engine 1, as shown by the line KHc in FIG. 3B.

Similarly, as shown by the line KLc in FIG. 3D, the opening amount of the low-pressure EGR valve 32 is changed, at time t2, from the reference low-pressure EGR valve opening amount (hereinafter, referred to as the "first low-pressure EGR valve opening amount") Olsfc1 corresponding to the first operation mode during the steady operation of the internal combustion engine 1 to the reference low-pressure EGR valve opening amount (hereinafter, referred to as the "second low-pressure EGR valve opening amount") Olsfc2 (<Olsfc1) corresponding to the second operation mode during the steady operation of the internal combustion engine 1.

As described above, the specified values are set to values at which the mixture ratio matches the optimum fuel-efficiency mixture ratio Rsfc. The mixture ratio is determined based on the high-pressure EGR gas amount that is achieved when the high-pressure EGR valve 42 is opened by the first high-pressure EGR valve opening amount Ohsfc1, namely, the reference high-pressure EGR gas amount (hereinafter, referred to as the "first high-pressure EGR gas amount") Ghsfc1 corresponding to the first operation mode during the steady operation of the internal combustion engine 1, and the low-pressure EGR gas amount achieved when the low-pressure EGR valve 32 is opened by the first low-pressure EGR valve opening amount Olsfc1, namely, the reference low-pressure EGR gas amount (hereinafter, referred to as the "first low-pressure EGR gas amount") Glsfc1 corresponding to the first operation mode during the steady operation of the internal combustion engine 1.

Similarly, the specified values are set to values at which the mixture ratio matches the optimum fuel-efficiency mixture ratio Rsfc. The mixture ratio is determined based on the high-pressure EGR gas amount that is achieved when the high-pressure EGR valve 42 is opened by the second high-pressure EGR valve opening amount Ohsfc2, namely, the reference high-pressure EGR gas amount (hereinafter, referred to as the "second high-pressure EGR gas amount") Ghsfc2 corresponding to the second operation mode during the steady operation of the internal combustion engine 1, and the low-pressure EGR gas amount achieved when the low-pressure EGR valve 32 is opened by the second low-pressure EGR valve opening amount Olsfc2, namely, the reference low-pressure EGR gas amount (hereinafter, referred to as the "second low-pressure EGR gas amount") Glsfc2 corresponding to the second operation mode during the steady operation of the internal combustion engine 1.

At time t2 at which the opening amount of the high-pressure EGR valve 42 is changed from the first high-pressure EGR valve opening amount Ohsfc1 to the second high-pressure EGR valve opening amount Ohsfc2, the amount of high-pressure EGR gas that passes through the high-pressure EGR valve 42 changes to the second high-pressure EGR gas amount Ghsfc2.

Because the exhaust manifold 18 and the intake manifold 17, which are communicated with each other through the high-pressure EGR passage 41, are close to each other, the high-pressure EGR passage 41 has a short length and a small passage volume. Accordingly, a portion of the high-pressure EGR gas flow path, which is downstream of the high-pressure EGR valve 42 and which leads to the cylinders 2, has a considerably short length and a small passage volume.

Therefore, the amount of high-pressure EGR gas which has already passed through the high-pressure EGR valve 42 and which still remains in the high-pressure EGR passage 41 or the intake manifold 17 without being taken into the cylinders 2 (hereinafter, referred to as the "residual high-pressure EGR gas) is considerably small at time t2 at which the opening amount of the high-pressure EGR valve 42 is changed.

Accordingly, as shown by the line GHc in FIG. 3C, when the opening amount of the high-pressure EGR valve 42 is changed from the first high-pressure EGR valve opening amount Ohsfc1 to the second high-pressure EGR valve opening amount Ohsfc2, the amount of high-pressure EGR gas actually taken in the cylinders 2 (hereinafter, referred to as the "actual high-pressure EGR gas amount") is promptly decreased from the first high-pressure EGR gas amount Ghsfc1 to the second high-pressure EGR gas amount Ghsfc2.

At time t2 at which the opening amount of the low-pressure EGR valve 32 is changed from the first low-pressure EGR valve opening amount Olsfc1 to the second low-pressure EGR valve opening amount Olsfc2, the amount of low-pressure EGR gas that passes through the low-pressure EGR valve 32 is changed to the second EGR gas amount Glsfc2.

However, because the low-pressure EGR passage 31 is connected to the intake pipe 3, at a position upstream of the compressor housing 5a, the compressor housing 5a, the inter cooler 8, etc. are located in a portion of the low pressure EGR gas flow path, which is downstream of the low-pressure EGR valve 32 and which leads to the cylinders 2. Accordingly, the portion of the low pressure EGR gas flow path has a long length and a large passage volume.

Therefore, the amount of low-pressure EGR gas which has already passed through the low-pressure EGR valve 32 and which still remains in the low-pressure EGR passage 32 or the intake pipe 3 without being taken into the cylinders 2 (hereinafter, referred to as the "residual low-pressure EGR gas") is relatively large at time t2 at which the opening amount of the low-pressure EGR valve 32 is changed.

Accordingly, as shown by the line GLc in FIG. 3E, after the opening amount of the low-pressure EGR valve 32 is changed from the first low-pressure EGR valve opening amount Olsfc1 to the second low-pressure EGR valve opening amount Olsfc2, the amount of low-pressure EGR gas actually taken in the cylinders 2 (hereinafter, referred to as the "actual low-pressure EGR gas amount") is gradually decreased from the first low-pressure EGR gas amount Glsfc1 to the second low-pressure EGR gas amount Glsfc2.

Namely, in the case of the low-pressure EGR gas, after the opening amount of the low-pressure EGR valve 32 is changed to the second low-pressure EGR valve opening amount Olsfc2, the actual low-pressure EGR gas amount is larger than the second low-pressure EGR gas amount Glsfc2 in the period $\Delta t23$ (hereinafter, referred to as the "low-pressure EGR gas amount transitional period").

Therefore, in the engine speed-up transitional operation period in which the operation mode of the internal combustion engine 1 is changing from the first operation mode to the second operation mode, even when the opening amount of the high-pressure EGR valve 42 is changed from the first high-pressure EGR valve opening amount Ohsfc1 to the second high-pressure EGR valve opening amount Ohsfc2 and the opening amount of the low-pressure EGR valve 32 is changed from the first low-pressure EGR valve opening amount Olsfc1 to the second low-pressure EGR valve opening amount Olsfc2, the entire EGR gas amount may be larger than the reference entire EGR gas amount (hereinafter, referred to as the "second entire EGR gas amount") Gt2 corresponding to the second operation mode in the low-pressure EGR gas amount transitional period $\Delta t23$, as shown by the line GTc in FIG. 3F. In this case, the oxygen concentration in the cylinders 2 may be insufficient with respect to the increased fuel injection amount, resulting in generation of smoke, as shown by the line Sc in FIG. 3G.

As described above, even if the opening amount of the low-pressure EGR valve 32 is changed, it is difficult to promptly change the actual low-pressure EGR gas amount. In contrast, if the opening amount of the high-pressure EGR valve 32 is changed, it is possible to promptly change the actual high-pressure EGR gas amount.

Accordingly, as in the engine speed-up transitional operation period, when the entire EGR gas amount is changed by changing the opening amount of the high-pressure EGR valve 32 and the opening amount of the low-pressure EGR valve 42, as the ratio of the high-pressure EGR gas amount to the entire EGR gas amount becomes higher, the entire EGR gas amount is changed to the target entire EGR gas amount more promptly. Therefore, it is possible to suppress occurrence of the situation in which the entire EGR gas amount is larger than the target entire EGR gas amount in the engine speed-up transitional operation period. As a result, it is possible to suppress generation of smoke.

Figure 4:
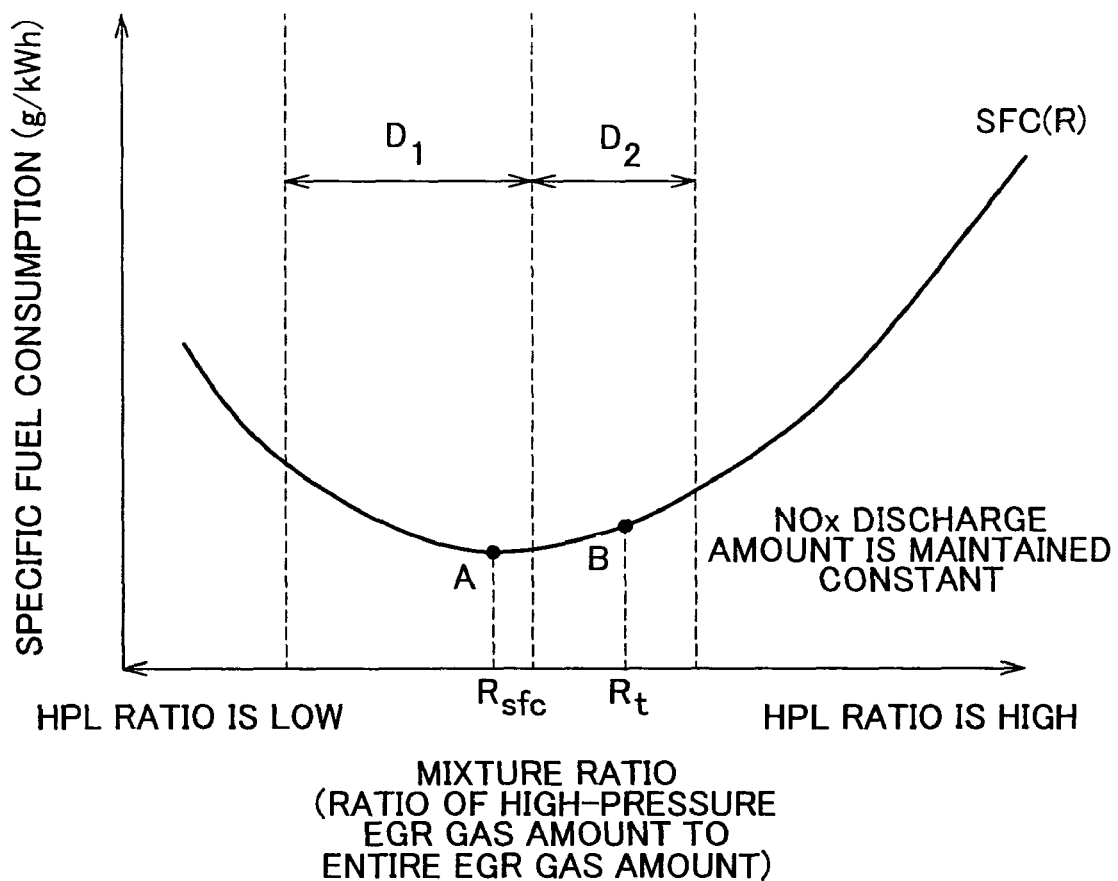
FIG. 4 is a graph showing a mixture ratio range in which the entire EGR gas amount is appropriately controlled in the engine speed-up transitional operation period in which the operation mode of the internal combustion engine provided with the EGR system according to the invention is changing, and another mixture ratio range in which it is difficult to appropriately control the entire gas amount in the engine speed-up transitional operation period.

In the mixture ratio range D1 in FIG. 4, the ratio of the high-pressure EGR gas amount to the entire EGR gas amount is relatively low. If the specified value of the mixture ratio corresponding to the first operation mode (hereinafter, referred to as the "first mixture ratio") is within the mixture ratio range D1, it takes relatively long for the entire EGR gas amount to change from the first entire EGR gas amount Gt1 to the second entire EGR gas amount Gt2 in the engine speed-up transitional operation period in which the operation mode of the internal combustion engine 1 is changing from the first operation mode to the second operation mode, and smoke may be generated.

On the other hand, in the mixture ratio range D2 in FIG. 4, the ratio of the high-pressure EGR gas amount to the entire EGR gas amount is relatively high. If the first mixture ratio is within the mixture ratio range D2, the entire EGR gas amount is promptly changed from the first entire EGR gas amount Gt1 to the second entire EGR gas amount Gt2 in the engine speed-up transitional operation period in which the operation mode of the internal combustion engine 1 is changing from the first operation mode to the second operation mode, and generation of smoke is appropriately suppressed. The mixture ratio range D2 is defined as the range in which deterioration in the specific fuel consumption, which is caused by changing the mixture ratio from the optimum fuel-efficiency mixture ratio Rsfc to the engine speed-up time mixture ratio Rt, falls within the allowable range.

As shown in FIG. 4, the optimum fuel-efficiency mixture ratio Rsfc is within the mixture ratio range D1. As described above, if the mixture ratio is at the optimum fuel-efficiency mixture ratio in the engine speed-up transitional operation period in which the operation mode of the internal combustion engine 1 is changing, smoke may be generated.

Therefore, according to the embodiment of the invention the mixture ratio in the engine speed-up transitional operation period, in which the operation mode of the internal combustion engine is changing, is set to the mixture ratio Rt that is within the mixture ratio range D2. Hereinafter, the mixture ratio Rt will be referred to as the engine speed-up time mixture ratio.

More specifically, at time t1 at which it is predicted that the operation mode of the internal combustion engine 1 will be changed from the first operation mode to the second operation mode, the opening amount of the high-pressure EGR valve 42 is changed to the corrected first high-pressure EGR valve opening amount Oht1 that is larger than the first high-pressure EGR valve opening amount Ohsfc1 as shown by the line KHi in FIG. 3B, and the opening amount of the low-pressure EGR valve 32 is changed to the corrected first low-pressure EGR valve opening amount Olt1 that is smaller than the first low-pressure EGR valve opening amount Olsfc1 as shown by the line KLi in FIG. 3D.

Then, at time t2 at which the operation mode of the internal combustion engine 1 is changed from the first operation mode to the second operation mode, the opening amount of the high-pressure EGR valve 42 is changed to the corrected second high-pressure EGk valve opening amount Oht2 that is smaller than the second high-pressure EGR valve opening amount Ohsfc2 as shown by the line LHi in FIG. 3B, and the opening amount of the low-pressure EGR valve 32 is changed to the second low-pressure EGR valve opening amount Olsfc2 as shown by the line KLi in FIG. 3D.

In addition, at time t3 at which the low-pressure EGR gas amount transitional period Δt23 ends, the opening amount of the high-pressure EGR valve 42 is changed from the corrected second high-pressure EGR valve opening amount Oht2 to the second high-pressure EGR valve opening amount Ohsfc2, as shown by the line KHi in FIG. 3B.

The corrected first high-pressure EGR valve opening amount Oht1 and the corrected first low-pressure EGR valve opening amount Olt1 are the opening amount of the high-pressure EGR valve 42 and the opening amount of the low-pressure EGR valve 32, respectively. When the corrected first high-pressure EGR valve opening amount Oht1 and the corrected first low-pressure EGR valve opening amount Olt1 are achieved, the sum of the high-pressure EGR gas amount (hereinafter, referred to as the "corrected first high-pressure EGR gas amount") Ght1, which is achieved when the high-pressure EGR valve 42 is opened by the corrected first high-pressure EGR valve opening amount Oht1 during the steady operation of the internal combustion engine 1, and the low-pressure EGR gas amount (hereinafter, referred to as the "corrected first low-pressure EGR gas amount") Glt1, which is achieved when the low-pressure EGR valve 32 is opened by the corrected first low-pressure EGR valve opening amount Olt1 during the steady operation of the internal combustion engine 1, is equal to the first entire EGR gas amount Gt1, and the mixture ratio that is determined based on the corrected first high-pressure EGR gas amount Ght1 and the corrected first low-pressure EGR gas amount Glt1 matches the engine speed-up time mixture ratio Rt.

Namely, when the opening amount of the high-pressure EGR valve 42 is changed to the corrected first high-pressure EGR valve opening amount Oht1 and the opening amount of the low-pressure EGR valve 32 is changed to the corrected first low-pressure EGR valve opening amount Olt1, the specified value of the EGR parameter is changed from the specified value corresponding to the point A in FIG. 4 to the specified value corresponding to the point B in FIG. 4.

In the transitional period, the operation mode of the internal combustion engine 1 changes but the characteristics related to the NOx reduction rate in the EGR system do not change (namely, the NOx discharge amount is maintained constant). The efficiency in controlling the EGR gas amount in the transitional period is enhanced by changing the specific value of the EGR parameter from the specific value corresponding to the point A to the specific value corresponding to the point B. At this time, as shown in FIG. 4, the mixture ratio deviates from the optimum fuel-efficiency mixture ratio Rsfc. Therefore, the specific fuel consumption related to performance of EGR is not the minimum value. However, deterioration in the specific fuel consumption due to this remains within the allowable range.

The corrected second high-pressure EGR valve opening amount Oht2 is the opening amount of the high-pressure EGR valve 42 determined in such a manner that the sum of the high-pressure EGR gas amount (hereinafter, referred to as the "corrected second high-pressure EGR gas amount") Ght2, which is achieved when the high-pressure EGR valve 42 is opened by the corrected second high-pressure EGR valve opening amount Oht2 during the steady operation of the internal combustion engine 2, and the actual low-pressure EGR gas amount in the low-pressure EGR gas amount transitional period Δt23 does not exceed the second entire EGR gas amount Gt2.

In other words, the corrected second high-pressure EGR gas amount Ght2 is set to a value that is smaller than the second high-pressure EGR gas amount Ghsfc2 by an amount by which the actual low-pressure EGR gas amount is larger than the second low-pressure EGR gas amount Glsfc2 in the low-pressure EGR gas amount transitional period Δt23.

As described above, the actual high-pressure EGR gas amount changes promptly in response to a change in the opening amount of the high-pressure EGR valve 42. Accordingly, if the opening amount of the high-pressure EGR valve 42 is changed from the corrected first high-pressure EGR valve opening amount Oht1 to the corrected second high-pressure EGR valve opening amount Oht2, the actual high-pressure EGR gas amount is promptly decreased from the corrected first high-pressure EGR gas amount Ght1 to the corrected second high-pressure EGR gas amount Ght2.

Thus, in the low-pressure EGR gas amount transitional period Δt23, the amount by which the actual low-pressure EGR gas amount is larger than the second low-pressure EGR gas amount Glsfc2 is canceled by the amount by which the actual high-pressure EGR gas amount is smaller than the second high-pressure EGR gas amount Ghsfc2. Therefore, the entire EGR gas amount is promptly changed to an amount that is not larger than the second entire EGR gas amount Gt2.

As a result, as shown by the line Si in FIG. 3G, the amount of smoke generated in the engine speed-up transitional operation period, in which the operation mode of the internal combustion engine is changing is suppressed.

Whether the operation mode of the internal combustion engine 1 will be changed from the first operation mode to the second operation mode may be predicted, for example, by determining whether the rate of time-change in the depression amount of the accelerator pedal 14, which is detected by the accelerator angle sensor 15, has exceeded a predetermined threshold value. Alternatively, the prediction may be made based on the rate of time-change in the fuel injection amount. Further alternatively, the prediction may be made based on the history of the depression amount of the accelerator pedal 14 or the history of the fuel injection amount.

Figure 5:
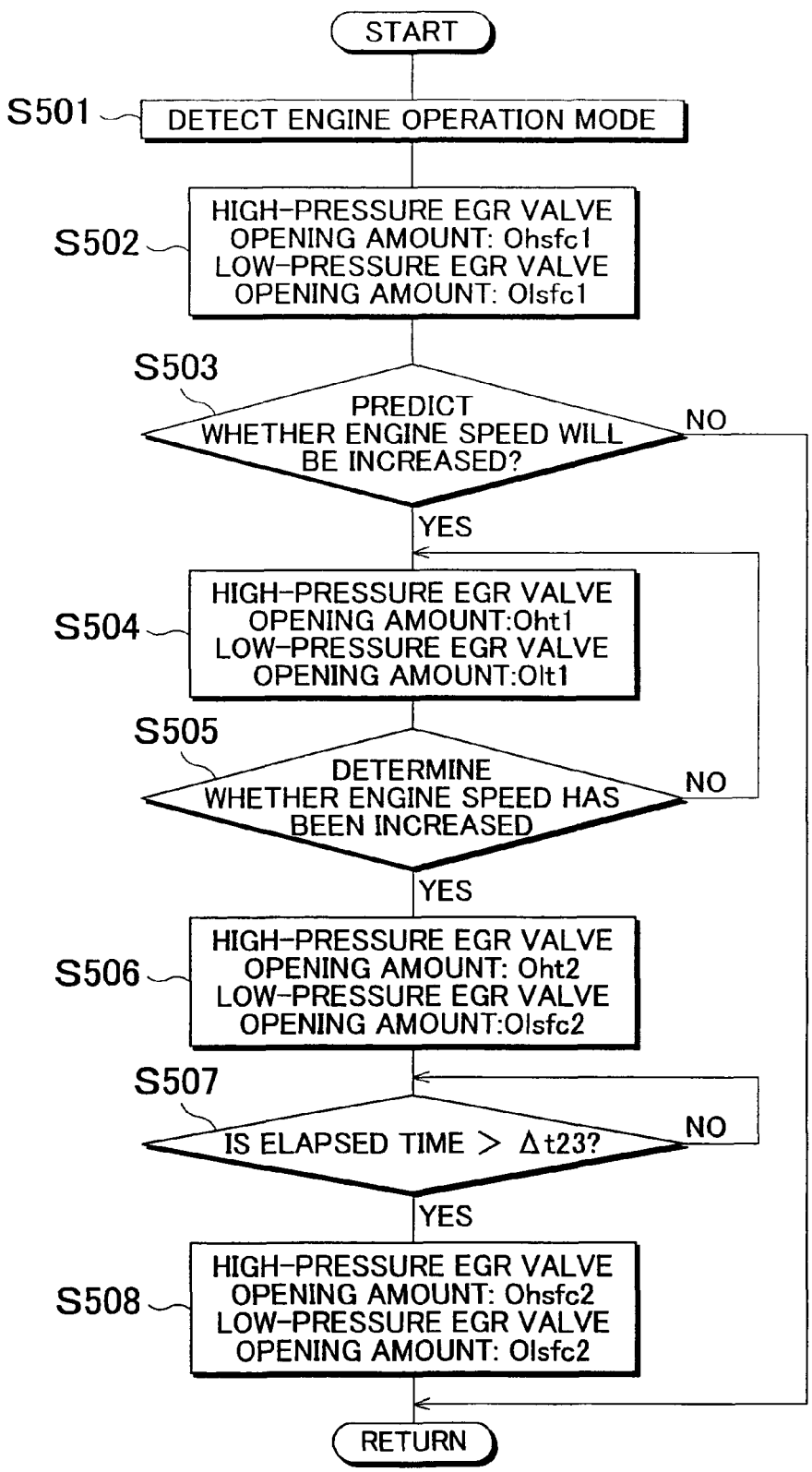
FIG. 5 is a flowchart showing the EGR control routine according to the embodiment of the invention.

Next, the EGR control according to the embodiment of the invention executed by the ECU 20 will be described with reference to the flowchart in FIG. 5. FIG. 5 is the flowchart showing the routine of the EGR control according to the embodiment of the invention.

In step S501, the ECU 20 detects the operation mode of the internal combustion engine 1. More specifically, the ECU 20 detects the engine speed based on the value detected by the crank position sensor 16, and the engine load based on the value detected by the accelerator angle sensor 15.

In step S502, the ECU 20 reads the reference high-pressure EGR valve opening amount Ohsfc1 and the reference low-pressure EGR valve opening amount Olsfc1 in the steady operation period, which correspond to the operation mode of the internal combustion engine 1 detected in step S501. Then, the ECU 20 controls the high-pressure EGR valve 42 so that the high-pressure EGR valve 42 is opened by the reference high-pressure EGR valve opening amount Ohsfc1, and the low-pressure EGR valve 32 so that the low-pressure EGR valve 32 is opened by the reference low-pressure EGR valve opening amount Olsfc1.

In step S503, the ECU 20 predicts whether operation mode of the internal combustion engine 1 is changed to the operation mode in which a load higher than that in the operation mode detected in step S501 is applied to the internal combustion engine 1. More specifically, the ECU 20 determines whether the rate of time-change in the value-detected by the accelerator angle sensor 15 has exceeded a predetermined threshold value with reference to the history of the value detected by the accelerator angle sensor 15. If an affirmative determination is made in step S503, the ECU 20 executes step S504. On the other hand, if a negative determination is made in step S503, the ECU 20 ends the routine.

In step S504, the ECU 20 brings the opening amount of the high-pressure EGR valve 42 to the corrected first high-pressure EGR valve opening amount Oht1, and brings the opening amount of the low-pressure EGR valve 32 to the corrected first low-pressure EGR valve opening amount Olt1.

In step S505, the ECU 20 determines whether the operation mode of the internal combustion engine 1 has been changed to the operation mode in which a load higher than that in the operation mode detected in step S501 is applied to the internal combustion engine 1. More specifically, the ECU 20 determines whether the fuel injection amount has been increased from the amount Q1 to the amount Q2. If an affirmative determination is made in step S505, the ECU 20 executes step S506. On the other hand, if a negative determination is made in step S505, the ECU 20 executes step S504 again.

In step S506, the ECU 20 brings the opening amount of the high-pressure EGR valve 42 to the corrected second high-pressure EGR valve opening amount Oht2, and brings the opening amount of the low-pressure EGR valve 32 to the second low-pressure EGR valve opening amount Olsfc2.

In step S507, the ECU 20 determines whether the time that has elapsed since the operation mode of the internal combustion engine 1 is changed to the operation mode, in which a load higher than that in the operation mode detected in step S501 is applied to the internal combustion engine 1, exceeds the length of the low-pressure EGR gas amount transitional period Δt23. The ECU 20 maintains the state realized in step S506 until an affirmative determination is made in step S507. When an affirmative determination is made in step S507, the ECU 20 executes step S508.

In step S508, the ECU 20 brings the opening amount of the high-pressure EGR valve 42 to the second high-pressure EGR valve opening amount Ohsfc2, and brings the opening amount of the low-pressure EGR valve 32 to the second low-pressure EGR valve opening amount Olsfc2, and then ends the routine.

Executing the routine described above makes it possible to appropriately suppress generation of smoke in the engine speed-up transitional operation period in which the operation mode of the internal combustion engine 1 changes.

While the invention has been described with reference to an example embodiment thereof, it is to be understood that the invention is not limited to the example embodiment. To the contrary, the invention is intended to cover various modifications and equivalent arrangements within the scope of the invention. For example, in the embodiment of the invention described above, the opening amount of the high-pressure EGR valve 42 is brought to the corrected first high-pressure FGR valve opening amount Oht1 and the opening amount of the low-pressure ER valve 32 is brought to the corrected first low-pressure EGR valve opening amount Olt1 at time t1 at which it is predicted that the rotational speed of the internal combustion engine 1 will increase. After the opening amount of the low-pressure EGR valve 32 is brought to the corrected first low-pressure EGR valve opening amount Olt1, the actual low-pressure EGR gas amount is gradually decreased to the corrected first low-pressure EGR gas amount Glt1. In consideration of this, the opening amount of the high-pressure EGR valve 42 may be gradually increased from the first high-pressure EGR valve opening amount Ohsfc1 to the corrected first high-pressure EGR valve opening amount Oht1. Thus, in the period until time t2 at which the operation mode of the internal combustion engine 1 is changed from the first operation mode to the second operation mode, the entire EGR gas amount is more reliably maintained at the first entire EGR gas amount Gt1, and the characteristics related to the NOx discharge amount in the EGR system are maintained more appropriately.

In the embodiment of the invention described above, the opening amount of the high-pressure EGR valve 42 is brought to the corrected second high-pressure EGR valve opening amount Obt2 at time t2 at which the operation mode of the internal combustion engine 1 is changed from the first operation mode to the second operation mode. Then, after the low-pressure EGR gas amount transitional period Δt23 has elapsed, the opening amount of the high-pressure EGR valve 42 is brought to the second high-pressure EGR valve opening amount Ohsfc2. The actual low-pressure EGR gas amount in the low-pressure EGR gas amount transitional period Δt23 is gradually decreased to the second low-pressure EGR gas amount Glsfc2. In consideration of this, the opening amount of the high-pressure EGR valve 42 may be gradually increased from the corrected second high-pressure EGR valve opening amount Oht2 to the second high-pressure EGR valve opening amount Ohsfc2. Thus, in the low-pressure EGR gas amount transitional period Δt23, the entire EGR gas amount is adjusted to the second entire EGR gas amount more reliably, and generation of smoke in the low-pressure EGR gas amount transitional period Δt23 is suppressed more reliably.

The invention claimed is:

1. An EGR system for an internal combustion engine, comprising:
   a turbocharger that includes a compressor arranged in an intake passage of the internal combustion engine, and a turbine arranged in an exhaust passage of the internal combustion engine:
   a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
   a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;

a high-pressure EGR valve that is provided in the high-pressure EGR passage, and that changes a flow passage area of the high-pressure EGR passage;

a low-pressure EGR valve that is provided in the low-pressure EGR passage, and that changes a flow passage area of the low-pressure EGR passage;

an EGR control unit that adjusts an opening amount of the high-pressure EGR valve to a reference high-pressure EGR valve opening amount determined based on an operation mode of the internal combustion engine, and adjusts an opening amount of the low-pressure EGR valve to a reference low-pressure EGR valve opening amount determined based on the operation mode of the internal combustion engine, wherein, in a transitional period in which the operation mode of the internal combustion engine is changing from a predetermined first operation mode to a second operation mode in which a load, which is higher than a load in the first operation mode, is applied to the internal combustion engine, the EGR control unit adjusts the opening amount of the high-pressure EGR valve to an opening amount that is smaller than a reference high-pressure EGR valve opening amount corresponding to the second operation mode; and an engine speed-up prediction unit that predicts whether the operation mode of the internal combustion engine is changed from the first operation mode to the second operation mode, wherein, when the engine speed-up prediction unit predicts that the operation mode of the internal combustion engine is changed from the first operation mode to the second operation mode, the EGR control unit adjusts the opening amount of the high-pressure EGR valve to an opening amount that is larger than a reference high-pressure EGR valve opening amount corresponding to the first operation mode so that a ratio of an amount of exhaust gas, recirculated back to the internal combustion engine by the high-pressure EGR unit, to a total amount of exhaust gas, recirculated back to the internal combustion engine by the high-pressure EGR unit and the low-pressure EGR unit, is higher than that before the engine speed-up prediction unit predicts that the operation mode of the internal combustion engine is changed from the first operation mode to the second operation mode.

2. An EGR system for an internal combustion engine comprising:

a turbocharger that includes a compressor arranged in an intake passage of the internal combustion engine, and a turbine arranged in an exhaust passage of the internal combustion engine:

a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;

a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;

a high-pressure EGR valve that is provided in the high-pressure EGR passage, and that changes a flow passage area of the high-pressure EGR passage;

a low-pressure EGR valve that is provided in the low-pressure EGR passage, and that changes a flow passage area of the low-pressure EGR passage; and an EGR control unit that adjusts an opening amount of the high-pressure EGR valve to a reference high-pressure EGR valve opening amount determined based on an operation mode of the internal combustion engine, and adjusts an opening amount of the low-pressure EGR valve to a reference low-pressure EGR valve opening amount determined based on the operation mode of the internal combustion engine, wherein, in a transitional period in which the operation mode of the internal combustion engine is changing from a predetermined first operation mode to a second operation mode in which a load, which is higher than a load in the first operation mode, is applied to the internal combustion engine, the EGR control unit adjusts the opening amount of the high-pressure EGR valve to an opening amount that is smaller than a reference high-pressure EGR valve opening amount corresponding to the second operation mode, wherein the EGR control unit maintains the opening amount of the high-pressure EGR valve at the opening amount that is smaller than the reference high-pressure EGR valve opening amount corresponding to the second operation mode during a predetermined period after the operation mode of the internal combustion engine is changed to the second operation mode.

3. An EGR system for an internal combustion engine comprising:

a turbocharger that includes a compressor arranged in an intake passage of the internal combustion engine, and a turbine arranged in an exhaust passage of the internal combustion engine;

a high-pressure EGR unit that recirculates a portion of exhaust gas back to the internal combustion engine through a high pressure EGR passage that provides communication between the exhaust passage, at a portion upstream of the turbine, and the intake passage, at a portion downstream of the compressor;

a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;

a high-pressure EGR valve that is provided in the high-pressure EGR passage, and that changes a flow passage area of the high-pressure EGR passage;

a low-pressure EGR valve that is provided in the low-pressure EGR passage, and that changes a flow passage area of the low-pressure EGR passage; and an EGR control unit that adjusts an opening amount of the high-pressure EGR valve to a reference high-pressure EGR valve opening amount determined based on an operation mode of the internal combustion engine, and adjusts an opening amount of the low-pressure EGR valve to a reference low-pressure EGR valve opening amount determined based on the operation mode of the internal combustion engine, wherein,
in a transitional period in which the operation mode of the internal combustion engine is changing from a predetermined first operation mode to a second operation mode in which a load, which is higher than a load in the first operation mode, is applied to the internal combustion engine, the EGR control unit adjusts the opening amount of the high-pressure EGR valve to an opening amount that is smaller than a reference high-pressure EGR valve opening amount corresponding to the second operation mode, wherein,
after the operation mode of the internal combustion engine is changed to the second operation mode, the EGR control unit gradually increases the opening amount of the high-pressure EGR valve from the opening amount, which is smaller than the reference high-pressure EGR valve opening amount corresponding to the second operation mode, toward the reference high-pressure EGR valve opening amount corresponding to the second operation mode, as an amount of exhaust gas recirculated back to the internal combustion engine by the low-pressure EGR unit is gradually decreased toward a reference low-pressure EGR gas amount corresponding to the second operation mode.

4. A method for controlling an EGR system for an internal combustion engine, the EGR system including:
a turbocharger that includes a compressor arranged in an intake passage of the internal combustion engine, and a turbine arranged in an exhaust passage of the internal combustion engine;
a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
a high-pressure EGR valve that is provided in the high-pressure EGR passage, and that changes a flow passage area of the high-pressure EGR passage, and
a low-pressure EGR valve that is provided in the low-pressure EGR passage, and that changes a flow passage area of the low-pressure EGR passage,
the method comprising:
adjusting an opening amount of the high-pressure EGR valve to a reference high-pressure EGR valve opening amount determined based on an operation mode of the internal combustion engine, and adjusting an opening amount of the low-pressure EGR valve to a reference low-pressure EGR valve opening amount determined based on the operation mode of the internal combustion engine;
adjusting, in a transitional period in which the operation mode of the internal combustion engine is changing from a predetermined first operation mode to a second operation mode in which a load higher than a load in the first operation mode is applied to the internal combustion engine, the opening amount of the high-pressure EGR valve to an opening amount that is smaller than a reference high-pressure EGR valve opening amount corresponding to the second operation mode;
predicting whether the operation mode of the internal combustion engine is changed from the first operation mode to the second operation mode; and
adjusting the opening amount of the high-pressure EGR valve to an opening amount that is larger than a reference high-pressure EGR valve opening amount corresponding to the first operation mode when it is predicted that the operation mode of the internal combustion engine is changed from the first operation mode to the second operation mode, so that a ratio of an amount of exhaust gas recirculated back to the internal combustion engine by the high-pressure EGR unit to a total amount of exhaust gas recirculated back to the internal combustion engine by the high-pressure EGR unit and the low-pressure EGR unit is higher than that before it is predicted that the operation mode of the internal combustion engine is changed from the first operation mode to the second operation.

5. A method for controlling an EGR system for an internal combustion engine, the EGR system including:
a turbocharger that includes a compressor arranged in an intake passage of the internal combustion engine, and a turbine arranged in an exhaust passage of the internal combustion engine;
a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
a high-pressure EGR valve that is provided in the high-pressure EGR passage, and that changes a flow passage area of the high-pressure EGR passage; and
a low-pressure EGR valve that is provided in the low-pressure EGR passage, and that changes a flow passage area of the low-pressure EGR passage,
the method comprising:
adjusting an opening amount of the high-pressure EGR valve to a reference high-pressure EGR valve opening amount determined based on an operation mode of the internal combustion engine, and adjusting an opening amount of the low-pressure EGR valve to a reference low-pressure EGR valve opening amount determined based on the operation mode of the internal combustion engine; and
adjusting in a transitional period in which the operation mode of the internal combustion engine is changing from a predetermined first operation mode to a second operation mode in which a load higher than a load in the first operation mode is applied to the internal combustion engine, the opening amount of the high-pressure EGR valve to an opening amount that is smaller than a reference high-pressure EGR valve opening amount corresponding to the second operation mode,
wherein
the opening amount of the high-pressure EGR valve is maintained at the opening amount that is smaller than the reference high-pressure EGR valve opening amount corresponding to the second operation mode during a predetermined period after the operation mode of the internal combustion engine is changed to the second operation mode.

6. A method for controlling an EGR system for an internal combustion engine, the EGR system including:
a turbocharger that includes a compressor arranged in an intake passage of the internal combustion engine, and a turbine arranged in an exhaust passage of the internal combustion engine;
a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
a high-pressure EGR valve that is provided in the high-pressure EGR passage, and that changes a flow passage area of the high-pressure EGR passage, and
a low-pressure EGR valve that is provided in the low-pressure EGR passage, and that changes a flow passage area of the low-pressure EGR passage,
the method comprising:
adjusting an opening amount of the high-pressure EGR valve to a reference high-pressure EGR valve opening amount determined based on an operation mode of the internal combustion engine, and adjusting an opening amount of the low-pressure EGR valve to a reference low-pressure EGR valve opening amount determined based on the operation mode of the internal combustion engine; and
adjusting, in a transitional period in which the operation mode of the internal combustion engine is changing from a predetermined first operation mode to a second operation mode in which a load higher than a load in the first operation mode is applied to the internal combustion engine, the opening amount of the high-pressure EGR valve to an opening amount that is smaller than a reference high-pressure EGR valve opening amount corresponding to the second operation mode,
wherein,
after the operation mode of the internal combustion engine is changed to the second operation mode, the opening amount of the high-pressure EGR valve is gradually increased from the opening amount, which is smaller than the reference high-pressure EGR valve opening amount corresponding to the second operation mode, toward the reference high-pressure EGR valve opening amount corresponding to the second operation mode, as an amount of exhaust gas recirculated back to the internal combustion engine by the low-pressure EGR unit is gradually decreased toward a reference low-pressure EGR gas amount corresponding to the second operation mode.

* * * * *